United States Patent [19]

Chapman et al.

[11] 3,882,108

[45] May 6, 1975

[54] PREPARATION OF 7-AMINO CEPHALOSPORIN COMPOUND

[75] Inventors: Philip Howard Chapman, Dendron near Ulverston; James Raymond Hilligan, Grange-over-Sands, both of England

[73] Assignee: Glaxo Laboratories Limited, Greenford, Middlesex, England

[22] Filed: Apr. 4, 1972

[21] Appl. No.: 241,087

[30] Foreign Application Priority Data
Apr. 7, 1971 United Kingdom.............. 8988/71

[52] U.S. Cl............................ 260/243 C; 424/246
[51] Int. Cl............................................ C07d 99/24
[58] Field of Search............................. 260/243 C

[56] References Cited
UNITED STATES PATENTS

| | | | |
|---|---|---|---|
| 3,499,909 | 3/1970 | Weissenburger et al........ | 260/243 C |
| 3,809,699 | 5/1974 | Ishimaru........................ | 260/306.7 |

FOREIGN PATENTS OR APPLICATIONS

2,126,037  12/1971  Germany

*Primary Examiner*—Nicholas S. Rizzo
*Attorney, Agent, or Firm*—Bacon & Thomas

[57] ABSTRACT

A process for preparing a 7-aminocephalosporin from a 7β-acylamidocephalosporin by the imide halide technique in which the 4-carboxyl group of the 7β-acylamido cephalosporin is first protected by reaction with a phosphorus trihalide, particularly phosphorus trichloride.

1 Claim, No Drawings

PREPARATION OF 7-AMINO CEPHALOSPORIN COMPOUND

This invention relates to a process for the preparation of 7-aminocephalosporins.

The compounds referred to in this specification are generally named with reference to cepham (see J.Amer. Chem. Soc. 1962, 84, 3400).

The N-deacylation of 7-acylamido cephalosporin compounds is an important step in the production of cephalosporin antibiotics. One method of N-deacylating a 7-acylamido cephalosporin compound is the so-called imidehalide technique which involves reacting the 7-acylamido compound with an agent, e.g. phosphorus pentachloride, believed to form an imide halide, converting the product of the reaction into a product believed to be an imino ether by reaction with an alcohol and cleaving the latter e.g. by hydrolysis to yield the desired 7-amino compound. Although the exact nature of the intermediate products is not known they are referred to herein, for convenience, as imide halides and imino ethers.

In order to successfully carry out such a method it is necessary first to protect the carboxyl group at the 4-position, and any other carboxyl group in the cephalosporin molecule, which otherwise may react with the imide halide forming agent.

Generally such a procedure involves, at least, a separate stage for the removal of the carboxyl protecting group at the end of the sequence and there is the risk that damage will be done to other parts of the cephalosporin, such as the β-lactam ring.

We have now found that a 7-acylamido cephalosporin compound with an unprotected 4-carboxy group may be subjected to the imide halide technique if the cephalosporin is first reacted with a phosphorus trihalide, especially phosphorus trichloride. This reaction is quite surpirsing because phosphorus trichloride has been previously suggested as an imide-halide forming compound, although to the best of our knowledge it has not been successfully employed for this purpose.

The use of a phosphorus trihalide in this way is more economical than protection as carbon or silicon esters and also has the important consequence that no separate step of deprotection of the 4-carboxyl group is required at the end of the imide halide process.

According to one embodiment of the invention there is provided a process for the preparation of a 7-amino cephalosporin which comprises reacting a 7β-acylamidocephalosporin acid with a phosphorus trihalide, especially phosphorus trichloride, in an inert organic solvent under substantially anhydrous conditions, contacting the resultant solution with an imide halide forming compound, commingling the resultant reaction mixture with an imino ether forming compound and then, preferably, with water, and recovering the 7β-aminocephalosporin formed, e.g. by adjusting the pH approximately to the isoelectric point by treatment with a base. If desired the end product may be recovered as an acid addition salt, e.g. the salt with p-toluene sulphonic acid.

The 7β-acylamidocephalosporin acid may be used as a salt or as a mixture of a free acid and base (organic or inorganic).

The 7β-acylamido cephalosporin acid employed as starting material may be compound of the general formula

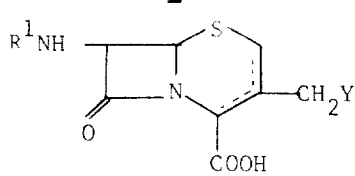

wherein
$R^1$ is a carboxylic acyl group having e.g. up to 20 carbon atoms; and
Y is hydrogen, acetate, the residue of a nucleophile (or product thereof)
or a salt thereof. The salt may be an alkali metal salt (e.g. sodium or potassium) or an organic ammonium salt, e.g. triloweralkylammonium such as triethylammonium; piperidinium; N-loweralkylpiperidinium such as N-ethylpiperidinium; N,N,N-dimethylphenylammonium, pyridinium, quinolinium or benzylammonium.

Reaction of the cephalosporin compound with the phosphorus trihalide takes place in the presence of a base which may be derived at least in part from a cephalosporin salt or may be added separately with a cephalosporin free acid. The base is preferably used in an amount of at least 2 molar equivalents. Suitable bases include organic tertiary amines e.g. N,N-dimethylaniline, or N,N-diethylaniline and inorganic bases e.g. potassium carbonate. Bases required in the imide halide and imino ether forming steps may conveniently be added in full amounts at this point, and thus up to 4 additional mole equivalents of the base may be added.

The inert organic solvent used for the reaction of the cephalosporin with the phosphorus trihalide should be substantially anhydrous (i.e. preferably contain less than 0.02% $H_2O$) and is preferably alcohol-free. It should desirably be chosen so that it is also suitable for subsequently carrying out the imide-halide technique. Suitable solvents thus include halogenated hydrocarbons e.g. methylene chloride, 1,2-dichloroethane or chloroform; cyclic or acyclic ethers e.g. tetrahydrofuran, dioxan, diethyl ether or diisopropyl ether or aromatic hydrocarbons e.g. benzene or toluene. Methylene chloride is particularly preferred, either alone or in admixture with other solvents.

A. Reaction with the Phosphorus Trihalide

The reaction of the cephalosporin compound with the phosphorus trihalide may be effected at a temperature of +65°C or less, advantageously at 25°C or less. A preferred temperature range for this reaction is from −50°C to 0°C.

The phosphorus trihalide may be used in an amount of from 0.20 to 2 or 2.5 moles, preferably 0.4 to 1.2 moles, for every carboxyl group in a mole of cephalosporin compound.

Advantageously, the reaction of the cephalosporin compound with the phosphorus trihalide is effected by suspending the cephalosporin in an inert organic solvent, (admixed with, if desired, base) at the desired temperature and adding the phosphorus trihalide to the suspension to the cephalosporin to go into solution. Alternatively the cephalosporin starting material may be in solution in the inert organic solvent prior to adding the phosphorus trihalide. The reaction mixture may be maintained at the desired temperature for a brief time, e.g. 30 minutes, to ensure completion of reaction and, if desired, then cooling to allow for any rise of temperature which may occur in the next step.

B. Imide Halide-Forming Step

Imide halide forming compounds which may be used include phosphorus pentachloride, thionyl chloride and phosgene. When phosphorus pentachloride is used, it is conveniently added in finely divided form, e.g. 10 mesh.

We particularly prefer to use phosphorus pentachloride for this reaction since the combination of using phosphorus trihalide in the initial reaction and using phosphorus pentachloride in this reaction facilitates subsequent solvent recovery and waste disposal problems. The phosphorus halides are converted by the operation of the process of the invention to high boiling organophosphorus compounds. Solvents can be readily stripped from mixtures of the solvents with these high boiling compounds.

This reaction with the imide halide forming compound is carried out in the presence of a base, preferably an organic base. Suitable organic bases, which preferably have a pKb of 4 to 6, include tertiary amines such as, for example, N,N-dimethyl aniline, or N,N-diethyl aniline. If excess base is used in the preceding reaction it will not normally be necessary to use further base in this reaction.

A mixture of the imide halide forming compound and the base may, in some circumstances, be contacted with the reaction solution from the previous step.

The imide halide forming compound may be added to the solution of the cephalosporin in molar excess and amounts of up to 10 molar excess may be used. It is uneconomical to use a large excess and we prefer to work with the cephalosporin compound and the imide halide forming compound in molar proportions of from 1 : 1 to 1 : 3. in the case of phosphorus pentachloride.

The temperature for the reaction of the imide halide forming compound with the cephalosporin may be from −50° to +25°C. The optimum temperature will depend, to some extend at least, on the reactants employed. Advantageously one operates within a temperature range of −40° to −10°C.

C. Imino-ether forming Step

The imino ether forming compound is advantageously a lower alkanol i.e. an alkanol having from 1 to 6 carbon atoms, for example methanol, ethanol, n-propanol n-butanol, isopropanol or isobutanol, preferably methanol.

Other imino ether forming compounds which may be used include diols of the formula $$HO-R^3-OH$$

where $R^3$ is a divalent alkylene or cycloalkylene group having 2, 3 or 4 carbon atoms in the carbon chain linking the oxygen atoms. Such diols include ethylene glycol, propane-1,2- and -1,3-diol and the various butane diols, e.g. butane-1,3-diol.

The imino ether forming compound may be used in substantial molar excess e.g. up to 75, and possibly even 100 moles over the cephalosporin compound.

Although the imino ether forming compound may be added to the reaction solution we prefer to add the reaction solution to the imino-ether-forming compound as this technique allows better control of the reaction system on a large scale.

The temperature for the reaction with the imino ether forming compound may be from −50° to +10°C. The optimum temperature will depend, to some extent at least, on the reactants employed and in general we prefer to carry this step out at temperatures of from −40° to 0°C.

The reaction may be carried out in the presence of an organic base, the base required being usually carried through from the previous reaction.

The reaction may also advantageously be carried out by mixing the imino ether forming compound with a substantially anhydrous acid since this appears to enhance the yield of the end product. The acid may be used in an amount of about 1 mole, based on the cephalosporin compound. Suitable acids include hydrogen chloride, concentrated sulphuric acid and p-toluene sulphonic acid.

On completion of the preceding reaction, the reaction mixture may be contacted with water or an aqueous medium, or if desired an aqueous solution of an acid which forms an insoluble acid addition salt with the amino compound.

The reaction with water may be effected at a temperature of from −5° to +20°C. Under the prevailing acidic conditions the hydrolysis reactions are driven to completion and the desired 7β-amino compound is formed. The 7β-amino compound may be readily recovered by raising the pH to its isolectric point i.e. ca 3.5 e.g. by treatment with aqueous ammonia.

The 7β-amino compound may be isolated as an acid addition salt e.g. the hydronitrate or hydrocarbylsulphonate. Examples of hydrocarbyl sulphonic acids include alkyl benzene sulphonic acids e.g. p-toluene sulphonic acid and lower alkane sulphonic acids e.g. methane sulphonic acid.

A wide variety of acyl groups may be removed from the cephalosporin compounds by the process of the present invention. Acyl groups that may be removed may have from 1 – 20 carbon atoms and may be chosen from the extensive lists of such groups in the literature. Illustrative of such groups are those having the general formula:- i. $R^aC_nH_{2n}CO-$ where $R^a$ is aryl (carbocyclic or heterocyclic), cycloalkyl, substituted aryl, and $n$ is 0 or an integer from 1-4. Examples of this group include phenylacetyl; substituted phenylacetyl e.g. fluorophenylacetyl; nitrophenylacetyl, acetoxyphenylacetyl, methoxyphenylacetyl, methylphenylacetyl, hydroxyphenylacetyl; thienyl-2- and -3-acetyl and furyl-2- and -3-acetyl.

ii. $C_mH_{2m+1}CO-$ where $m$ is an integer from 1–7. The alkyl group may be straight or branched and, if desired, may be interrupted by an oxygen or sulphur atom or substituted by e.g. a cyano group, a carboxy group, an alkoxycarbonyl group, a hydroxy group, a carboxycarbonyl group (—CO.COOH) or a halogen atom. Examples of such groups include cyanoacetyl, hexanoyl, heptanoyl, octanoyl, butylthioacetyl and HOOC (CH$_2$)$_3$CO-.

iii.

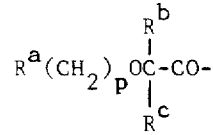

where $R^a$ has the meaning defined under (i), $p$ is 0 or 1 and $R^b$ and $R^c$ which may be the same or different each represent hydrogen, phenyl, benzyl, phenethyl or lower alkyl. An example of such a group is phenoxyacetyl.

iv. Amino acyl, derived from naturally occurring amino acids e.g. 5-aminoadipoyl and derivatives thereof e.g. N-benzoyl-5-aminoadipoyl.

Where the cephalosporin contains a free amino group in the 7-side chain, it is usually necessary to protect it before reaction with the phosphorus trihalide. Alternatively, the starting material may contain a protected amino group.

Protected amino groups which may be used include groups of the following types:

1. Acylamino, for example carboxamides derived from aliphatic and aromatic carboxylic acids and hydrocarbyl sulphonamides. Examples of such groups include acetamido, chloroacetamido, benzoylamido, phthaloylamido, benzenesulphonamido and p-toluene sulphonamido.

2. Urethane. Examples of such groups include trichloroethoxycarboxamido and isobutyloxycarboxamido 3. Amine groups protected by reaction with formaldehyde and a β-keto ester to form a dihydropyridine ring. Examples of β-ketoesters which may be used are methyl and ethyl acetoacetate. Such protection is particularly important in the case of cephalosporin C (i.e. 3-acetoxymethyl-7β-(D-5-amino-5-carboxypentanamido) ceph-3-em-4-carboxylic acid), which is conveniently prepared in the form of such dihydropyridyl derivatives. Protecting groups of this type are described in our Belgian Patent No. 771694.

N-Protected cephalosporin compounds need not be isolated from the reaction medium in which they are prepared prior to being subjected to the process according to the invention.

In order that the invention may be well understood the following examples are given by way of illustration only:

EXAMPLE 1

Phosphorus trichloride (5.25 ml, 0.06 mole) was added over one minute to a stirred suspension of 3-acetoxymethyl-7β-(5-benzoylamido-5-carboxypentanamido)ceph-3-em-4-carboxylic acid (10.54 g. 0.02 mole) in dry methylene chloride (150 ml) containing N,N-dimethylaniline (14.0 ml, 0.11 mole) at +10°C. The input material dissolved rapidly (three minutes) to give a pale yellow solution and the temperature was then raised to +20°C and stirring continued for a further 35 minutes.

The solution temperature was then lowered to −20°C and phosphorus pentachloride (6.25 g, 0.03 mole) added and the mixture stirred for 1½ hours at −15°C. After cooling to −40°C cold methanol (75 ml) was added and the mixture stirred at −5°C for 20 minutes. Water (44 ml) was then added and the pH (1.0) raised to 3.5 with aqueous ammonia (0.88). The mixture was cooled to +5°C and stood for ½ hour.

Filtration and washing with water and methanol gave 7β-amino-3-acetoxymethylceph-3-em-4-carboxylic acid (3.81 g).

EXAMPLE 2

Phosphorus trichloride (4.5 ml, 0.0513 mole) was added in one portion to a stirred suspension of 3-acetoxy methyl-7β-(5-benzoylamido-5-carboxypentanamido)ceph-3-em-4-carboxylic acid (10.44 g, 0.02 mole) in dry methylene chloride (150 ml) containing N,N-dimethylaniline (15.2 ml, 0.1186 mole) maintained at −10°C. The mixture was stirred at −10°C for 45 minutes during which time the input material dissolved.

The solution temperature was lowered to −20°C and phosphorus pentachloride (8.33 g, 0.04 mole) was added and the mixture stirred at −15°C for 2 hours. After cooling to −40°C, cold (−40°C) methanol (75 ml) was added and the mixture stirred at −5°C for 25 minutes. Water (44 ml) was added and the pH of 1.0 adjusted to 3.3 with aqueous ammonia (17.0 ml). The resultant slurry was cooled to +5°C and stood for 1 hour.

Filtration and washing the product with water and methanol afforded 3-acetoxymethyl-7β-aminoceph-3-em-4-carboxylic acid (4.55 g, 83.54%). This was converted to the toluene p-hydrosulphonate in 95.06% yield giving a yield of 79.12%.

EXAMPLE 3

Phosphorus trichloride (4.50 ml, 0.051 mole) was added rapidly to a suspension of 3-acetoxymethyl-7β-(5-benzoyl amido-5-carboxypentanamido)ceph-3-em-4-carboxylic acid (10.44 g, 0.020 mole) in dry methylene chloride (150 ml) containing N,N-dimethylaniline (15.2 ml, 0.12 mole) and cooled to −55°C. A clear solution was obtained after stirring the mixture for 1 hour 25 minutes at −30°C. Phosphorus pentachloride (8.33 g, 0.040 mole) was added and stirring continued for 2 hours 35 minutes at −25°C. The mixture was cooled to −40°C and cold (−30°C) methanol (75 ml) added rapidly. After stirring at −5°C for 25 minutes water (44 ml) was added and the pH (0.95 ) raised to 3.5 with aqueous ammonia (0.88). The mixture was cooled and allowed to stand for 1 hour at +5 °C.

Filtration and washing gave 3-acetoxymethyl-7β-amino-ceph-3-em-4-carboxylic acid (5.36 g).

EXAMPLE 4

Phosphorus trichloride (4.50 ml, 0.051 mole) was added rapidly to a suspension of 3-acetoxymethyl-7β-(5-benzoylamido-5-carboxypentanamido)ceph-3-em-4-carboxylic acid (10.44 g, 0.020 mole) in dry methylene chloride (150 ml) containing N,N-dimethylaniline (9.08 ml, 0.072 mole) at −15°C. The input material dissolved rapidly (5 minutes) to give a pale yellow solution. Stirring was continued at −10°C for a further 40 minutes and the solution then cooled to −20°C. N,N-dimethylaniline (6.12 ml, 0.048 mole) and phosphorus pentachloride (8.33 g, 0.040 mole) were added successively and the mixture stirred for 2 hours at −15°C. After cooling to −40°C, cold methanol (75 ml) was added and the mixture stirred at −5°C for 25 minutes. Water (44 ml) was then added and the pH 0.80 raised to 3.5 with aqueous ammonia (0.88 ). The mixture was cooled to +5°C and stood for one hour.

Flltration and washing gave 3-acetoxymethyl-7β-amino-ceph-3-em-4-carboxylic acid (4.62g).

EXAMPLE 5

Phosphorus trichloride (2.14 ml, 0.0245 mole) was added rapidly to a suspension of 3-acetoxymethyl-7β-(5-benzoylamido-5-carboxypentanamido)ceph-3-em-4-carboxylic acid (10.44 g, 0.020 mole) in dry methylene chloride (150 ml) containing N,N-dimethylaniline (15.2 ml, 0.12 mole) at −15°C. The input material dissolved (10 minutes) and was stirred at −10°C for 45 minutes.

The solution temperature was lowered to −20°C and phosphorus pentachloride (8.33 gms, 0.040 mole) added and the mixture stirred for 2 hours at −15°C.

After cooling to −40°C phosphorus trichloride (0.90 ml, 0.010 mole) followed by cold methanol (75 ml) were added and the mixture stirred at −5°C for 25 minutes. Water (44 ml) was then added and the pH (0.9) raised to 3.5 with ammonia (0.88). The mixture was cooled to +5°C and stood for 1 hour.

Filtration and washing gave 3-acetoxymethyl-7β-amino-ceph-3-em-4-carboxylic acid (4.38 g).

EXAMPLE 6

Phosphorus trichloride (3.93 ml, 0.045 mole) was added as a solution in methylene chloride (10 ml) over 5 minutes to a suspension of sodium 3-acetoxymethyl-7β-(5-benzenesulphonamido-5-carboxypentanamido)ceph-3-em-4-carboxylate (8.66 g) in methylene chloride (110 ml) containing N,N-dimethylaniline (7.61 ml, 0.06 mole) maintained at −15°C. The input material dissolved rapidly but stirring was continued at −10°C for 35 minutes before cooling to −20°C. N,N-dimethylaniline (3.8 ml, 0.03 mole) and phosphorus pentachloride (6.25 g., 0.03 mole) were added successively and the mixture stirred for 40 minutes at −15°C. After cooling to −50°C, cold (−40°C) methanol (60 ml.) was added and the mixture stirred at −5° for 20 minutes. Water (33 ml.) was added and the pH of the mixture raised to 3.5 by addition of ammonia solution. Filtration and washing of the resultant slurry gave 7β-amino-3-acetoxymethylceph-3-em-4-carboxylic acid (2.70 g).

EXAMPLE 7

Phosphorus trichloride (3.5 ml. 0.040 mole) was added rapidly to a suspension of finely ground sodium 3-acetoxymethyl-7β-(2-thienylacetamido)ceph-3-em-4-carboxylate (8.368 g., 0.020 mole) in methylene chloride (60 ml.) containing N,N-dimethylaniline (5.07 ml., 0.04 mole) maintained at −10°. The input material dissolved slowly and after 1 hour the temperature was raised to 0°C and stirring continued for a further 2 hours.

The solution was then cooled to −20°C and phosphorus pentachloride (5.42 g., 0.026 mole) added and the mixture stirred for 2 hours at −17°. The mixture was then further cooled to −50° and cold (−30°) methanol (44 ml.) added in such a way that the temperature did not rise above 0°C. After stirring at 0°C for 20 minutes, water (33 ml.) was added and the pH(0.4) raised to 3.5 with ammonia solution.

Filtration and washing of the resultant slurry gave 7β-amino-3-acetoxymethylceph-3-em-4-carboxylic acid (1.20 g).

EXAMPLE 8

3-Acetoxymethyl-7β-(5-phthaloylamido-5-carboxypentanamido)ceph-3-em-4-carboxylic acid (8.175 g.) was added to methylene chloride (90 ml.) containing N,N-dimethylaniline (7.6 ml., 0.06 mole) maintained at +16°. The input material dissolved rapidly and the solution was cooled to −15°C. Phosphorus trichloride (3.94 ml., 0.045 mole) was then added and the yellow solution stirred for 30 minutes before cooling to −20°C. N,N-dimethylaniline (3.81 ml., 0.03 mole) and phosphorus pentachloride (6.25 g., 0.03 mole) were added successively and the mixture stirred for 2 hours at −15°.

After cooling to −50°, cold (−40°C)methanol (40 ml.) was added and the mixture stirred at −5° for 20 minutes. Water (30 ml.) was then added and the pH (0.4) raised to 3.5 by addition of ammonia solution. Filtration and washing of the resultant slurry gave 7β-amino-3-acetoxymethylceph-3-em-4-carboxylic acid (2.67 g).

EXAMPLE 9

Phosphorus trichloride (2.62 ml., 0.03 mole) was added rapidly to a suspension of 3-acetoxymethyl-7β-(5-trichloroethoxycarboxamido-5-carboxypentanamido)ceph-3-em-4-carboxylic acid (5.905 g.) in methylene chloride (74 ml.) containing N,N-dimethylaniline (5.07 ml., 0.04 mole) maintained at −15°C. The input material dissolved rapidly to give a clear solution but stirring was continued at −10°C for 50 minutes before cooling to −20°C. N,N-dimethylaniline (2.53 ml., 0.02 mole) and phosphorus pentachloride (4.16 g., 0.02 mole) were added successively and the mixture stirred for 1¼ hours at −15°. After cooling to −50°C, cold (−40°C) methanol (40 ml.) was added and the mixture stirred at −5°C for 15 minutes. Water (22 ml.) was added and the pH of the mixture raised to 3.5 by addition of ammonia solution. Filtration and washing of the resultant slurry gave 7β-amino-3-acetoxymethylceph-3-em-4-carboxylic acid (1.67 g.).

EXAMPLE 10

3-Acetoxymethyl-7β-(5-p-toluenesulphonylamido-5-carboxypentanamido)ceph-3-em-4-carboxylic acid (5.7 g.) was added to methylene chloride (75 ml.) containing N,N-dimethylaniline (7.6 ml., 0.06 mole) and maintained at 20°C. The input material dissolved rapidly and the solution was cooled to −20°C. Phosphorus trichloride (1.53 ml., 0.0175 mole) was then added and the solution stirred for 30 minutes, temperature being maintained at −20°C. Phosphorus pentachloride (4.17 g., 0.02 mole) was then added and the mixture stirred for 2 hours at −20°C.

The mixture was then cooled to −50°C and cold (−40°C) methanol (37 ml.) added and the mixture stirred at −5°C for 20 minutes. Water (22 ml.) was added and the pH (0.6) raised to 3.5 by addition of ammonia solution. Filtration and washing of the resultant slurry gave 7β-amino-3-acetoxymethylceph-3-em-4-carboxylic acid (1.85 g).

EXAMPLE 11

Phosphorus trichloride (0.7 ml., 0.008 mole) was added rapidly to a suspension of 7β-phenylacetamido-3-methylceph-3-em-4-carboxylic acid (3.32 g.) in methylene chloride (30 ml.) containing N,N-dimethylaniline (3.8 ml., 0.03 mole) maintained at −30°C. The mixture was stirred for 22 minutes and then phosphorus pentachloride (2.71 g., 0.013 mole) added. After stirring the mixture for 36 minutes at −30°C the mixture was cooled to −50°C and cold (−40°C) methanol (30 ml.) added. The mixture was stirred for 18 minutes at −5°C and then water (23 ml.) added and the pH(0.60) raised to 3.8 by addition of ammonia solution. Filtration and washing of the resultant slurry gave 7β-amino-3-methylceph-3-em-4-carboxylic acid (1.46 g).

EXAMPLE 12

Phosphorus trichloride (1.5 ml., 0.0175 mole) was added rapidly to a solution of 3-acetoxymethyl-7β-(5-isobutyloxycarboxamido-5-carboxypentanamido)ceph-3-em-4-carboxylic acid (5.5 g.) in methylene chloride (75 ml.) containing N,N-dimethylaniline (7.6 ml., 0.06 mole) maintained at −15°C. The solution was stirred at −15°C for 45 minutes.

The solution temperature was lowered to −20°C and phosphorus pentachloride (4.16 g., 0.02 mole) was added and the mixture stirred for 2 hours at −15°C. After cooling to −40°C, cold methanol (37 ml.) was added and the mixture stirred for 15 minutes at −5°C. Water (22 ml.) was added and the pH adjusted from 0.2 to 3.5 with ammonia (0.880). The mixture was cooled to +5°C and stood for 1 hour. Filtration and washing gave 7β-amino-3-acetoxymethylceph-3-em-4-carboxylic acid (2.0 g.).

EXAMPLE 13

Phosphorus trichloride (1.5 ml., 0.0175 mole) was added rapidly to a suspension of 3-acetoxymethyl-7β-(5-chloroacetamido-5-carboxypentanamido)ceph-3-em-4-carboxylic acid (4.9 g.) in methylene chloride (75 ml.) containing N,N-dimethylaniline (7.6 ml., 0.06 mole) cooled to −15°C. The input material dissolved slowly (60 minutes) and stirring was continued for a further 30 minutes at −10°C.

The solution temperature was lowered to −20°C and phosphorus pentachloride (4.16 g., 0.02 mole) was added and the mixture stirred for 2 hours at −15°C. After cooling to −40°C, cold methanol (37 ml.) was added rapidly and the mixture stirred for 15 minutes at −5°C. Water (22 ml.) was then added and the pH raised from 0.6 to 3.5 by addition of ammonia (0.880). The mixture was cooled to +5°C and stood for 1 hour. Filtration and washing gave 7β-amino-3-acetoxymethylceph-3-em-4-carboxylic acid (1.50 g.).

EXAMPLE 14

Phosphorus trichloride (1.5 ml., 0.0175 mole) was added to a suspension of 3-acetoxymethyl-7β-(5-acetamido-5-carboxypentanamido)ceph-3-em-4-carboxylic acid (4.5 g.) in methylene chloride (75 ml.) containing N,N-dimethylaniline (7.6 ml., 0.06 mole) cooled to −15°C. The mixture was stirred at −10°C for 1 hour, during which time the input material dissolved slowly.

The temperature was lowered to −20°C and phosphorus pentachloride (4.16 g, 0.020 mole) added and the mixture stirred at −15°C for 2 hours. The solution was cooled to −40°C and cold methanol (37 ml.) was added and the mixture stirred at −5°C for 15 minutes. Water (22 ml.) was added and the pH raised from 0.4 to 3.5 by addition of ammonia (0.880). The mixture was cooled to +5°C and stood for 1 hour. After filtration and washing 7β-amino-3-acetoxymethylceph-3-em-4-carboxylic acid (1.25 g.) was obtained.

EXAMPLE 15

Phosphorus trichloride (3.03 ml., 0.035 mole) was added rapidly to a suspension of 3-acetoxymethyl-7β-(5-benzoylamido-5-carboxypentanamido)ceph-3-em-4-carboxylic acid (10.44 g., 0.02 mole) in methylene chloride (150 ml) containing N,N-dimethylaniline (15.2 ml., 0.12 mole) cooled to −15°C. The input material dissolved slowly (30 minutes) and stirring was continued for a further 15 minutes at −10°C. The solution temperature was lowered to −20°C and phosphorus pentachloride (8.33 g., 0.040 mole) added and the mixture stirred for two hours at −15°C. After cooling to −40°C, 1,3-butanediol (175 mls.) was added over a period of 10 minutes and the mixture stirred at −20°C for a further 5 minutes. Water (44 ml.) was added and the solution temperature allowed to raise to +5°C. The pH of the mixture was raised from 0.5 to 3.5 by the addition of ammmonia (0.880), and the mixture stood for 1 hour at +5°C. Filtration and washing gave 7β-amino-3-acetoxymethylceph-3-em-4-carboxylic acid (3.95 g.).

EXAMPLE 16

Phosphorus trichloride (3.03 ml., 0.035 mole) was added rapidly to a suspension of 3-acetoxymethyl-7β-(5-benzoylamido-5-carboxypentanamido)ceph-3-em-4-carboxylic acid (10.44 g., 0.02 mole) in methylene chloride (175 ml.) containing N,N-dimethylaniline (15.2 ml., 0.12 mole) cooled to −15°C. The input material dissolved alowly (20 minutes) and the mixture was stirred for a further 25 minutes at −10°C.

The solution temperature was lowered to −20°C and phosphorus pentachloride (8.33 g., 0.040 mole) added and the mixture stirred for 2 hours at −15 °C. The solution was cooled to −40°C and ethylene glycol (110 ml.) added over a period of 10 minutes and the mixture stirred for a further 5 minutes at −20°C. Water (44 ml.) was added and the solution temperature allowed to rise to +5°C. The pH was raised from 0.5 to 3.5 by addition of ammonia (0.880). The mixture was cooled to +5°C and stood for 1 hour. Filtration and washing gave 7β-amino-3-acetoxymethylceph-3-em-4-carboxylic acid (4.70 g.).

EXAMPLE 17

Sodium 7-(5-carboxy-5-[3,5-dicarbethoxy-2,6-dimethyl-1,4-dihydropyridin-1-yl]pentanamido)-3-acetoxymethylceph-3-em-4-carboxylate (26.936 g., 0.039 mole) was added to methylene chloride (300 ml.) to give a pale yellow solution which was then cooled to −15°C. N,N-dimethylaniline (20.28 ml., 0.160 mole) was added and then phosphorus trichloride (10.48 ml., 0.120 mole) added over 5 minutes. Stirring was continued at −15°C for a further 20 minutes, the solution was cooled to −20°C, and N,N-dimethylaniline (10.14 ml., 0.08 mole) was added. Phosphorus pentachloride (16.66 g., 0.08 mole) was added followed, after stirring for twenty minutes at −17°C, by N,N-dimethylaniline (10.14 ml., 0.08 mole) and the mixture was then transferred to methanol (160 ml.) precooled to −45°C. The temperature rose to −10°C and after stirring for 20 minutes at that temperature water (88 ml.) was added. The mixture was then stirred at +10°C for 2 minutes and the pH raised to 3.5 with ammonia solution. Filtration of the resultant slurry gave 7β-amino-3-acetoxymethylceph-3-em-4-carboxylic acid (8.40 g).

EXAMPLE 18

Phosphorus trichloride (3.03 ml, 0.035 mole) was added rapidly to a suspension of 3-acetoxymethyl-7β-(5-benzoylamido-5-carboxypentanamido)ceph-3-em-4-carboxylic acid (10.44 g, 0.02 mole) in methylene chloride (150 ml.) containing N,N-dimethylaniline (15.2 ml, 0.12 mole) which had been cooled to −15°C. The input material dissolved slowly (30 minutes) and stirring was continued for a further 15 minutes at −10°C. The temperature was lowered to −20°C and phosphorus pentachloride (8.33 g, 0.04 mole) added and the mixture stirred for 2 hours at −15°C. After cooling to −40°C, cold propan-2-ol (75 ml.) was added rapidly and the mixture stirred for 15 minutes at −5°C. Water (44 ml.) was added and the pH raised from 0.4 to 3.5 by addition of ammonia (0.880). The mixture was cooled to +5° C and stood for 1 hour. Filtration and washing gave 7β-amino-3acetoxymethylceph-3-em-4-carboxylic acid (3.55 g.).

EXAMPLE 19

Phosphorus trichloride (3.03 ml, 0.035 mole) was added rapidly to a suspension of 3-acetoxymethyl-7β-(5-benzoylamido-5-carboxypentanamido)ceph-3-em-4-carboxylic acid (10.44 g, 0.02 mole) in methylene chloride (150 ml.) containing N,N-dimethylaniline (15.2 ml, 0.12 mole) which had been cooled to −15°C. The input material dissolved slowly (30 minutes) and stirring was continued for a further 15 minutes at −10°C.

The temperature was lowered to −20°C and phosphorus pentachloride (8.33 g, 0.04 mole) added and the mixture stirred for 2 hours at −15°C. After cooling to −40°C, cold butan-1-ol (75 ml.) was added rapidly and the mixture stirred for 15 minutes at −5°C. Water (44 ml.) was added and the pH raised from 0.5 to 3.5 by addition of ammonia (0.880). The mixture was cooled to +5°C and stood for 1 hour. Filtration and washing gave 7β-amino-3-acetoxymethylceph-3-em-4-carboxylic acid (4.30 g.).

EXAMPLE 20

To a suspension of 3-acetoxymethyl-7β-(5-benzoylamido-5-carboxypentanamido)ceph-3-em-4-carboxylic acid (10.44 g, 0.02 mole) in methylene chloride (150 ml.) containing N,N-dimethylaniline (15.2 ml, 0.12 mole) at −15°C was added phosphorus trichloride (3.03 ml, 0.035 mole). The input material dissolved slowly (30 minutes) and stirring was continued for a further 15 minutes at −10°C. The temperature was lowered to −20°C and phosphorus pentachloride (8.33 g, 0.04 mole) was added and the mixture stirred for 2 hours at −15°C. After cooling to −40°C, cold propan-1-ol (75 ml.) was added rapidly and the mixture stirred for 15 minutes at −5°C. Water (44 ml.) was then added and the pH raised from 0.4 to 3.5 by addition of ammonia (0.880). The mixture was cooled to +5°C and stood for 1 hour. Filtration and washing gave 7β-amino-3-acetoxymethylceph-3-em-4-carboxylic acid (4.2 g.).

EXAMPLE 21

N,N-Diethylaniline (8.62 ml, 0.054 mole) was added over 18 minutes to a suspension of 3-acetoxymethyl-7β-(5-benzoylamido-5-carboxypentanamido)ceph-3-em-4-carboxylic acid (7.95 g, 0.015 mole) in methylene chloride (112 ml.) containing phosphorus trichloride (3.37 ml, 0.0385 mole) and maintained at −15°C. The input material dissolved and stirring was continued for 40 minutes before adding N,N-diethylaniline (5.74 ml, 0.036 mole) and phosphorus pentachloride (6.24 g, 0.03 mole). The mixture was stirred for 2 hours at −15°C and then cooled to −50°C.

Cold (−40°C) methanol (56 ml.) was added and the solution stirred at −5°C for 20 minutes. Water (33 ml.) was addded and the pH of the mixture raised to 3.5 by addition of ammonia solution. Filtration and washing of the resultant slurry gave 7β-amino-3-acetoxymethylceph-3-em-4-carboxylic acid (2.90 g.).

We claim:-

1. In a process for the preparation of 7β-amino-3-acetoxymethylceph-3-em-4-carboxylic acid, the steps which include reacting 3-acetoxymethyl-7β-(D-5-amino-5-carboxypentanamido)ceph-3-em-4-carboxylic acid wherein the amino group is blocked with from about 0.20 to about 2 moles of a phosphorus trihalide selected from the group consisting of phosphorus trichloride and phosphorus tribromide at a temperature from about −50°C to about +65°C in an organic halogenated solvent selected from the group consisting of methylene chloride, 1,2-dichloroethane and chloroform under anhydrous conditions; contacting the resultant solution with phosphorus pentachloride in molar proportions of about 1:1 to about 1:3 based on the cephalosporin at a temperature from about −50°C to about +25°C; commingling the resultant reaction mixture with a molar excess of an imino ether forming compound selected from the group consisting of alkanols having from 1 to 6 carbon atoms and alkane diols having 2 to 4 carbon atoms at a temperature from about −50°C to about +10°C; and recovering 7β-amino-3-acetoxymethylceph-3-em-4-carboxylic acid by treatment with a base to raise the pH to about 3.5.

* * * * *